(12) United States Patent
Dillat

(10) Patent No.: US 6,217,227 B1
(45) Date of Patent: Apr. 17, 2001

(54) CONNECTING DEVICE FOR OPTICAL FIBER CABLES

(75) Inventor: Michel Louis Romain Dillat, Courbevoie (FR)

(73) Assignee: Proptic, Rosny-Sous-Bois (FR)

( * ) Notice: Subject to any disclaimer, the term of this patent is extended or adjusted under 35 U.S.C. 154(b) by 0 days.

(21) Appl. No.: 09/297,770

(22) PCT Filed: Nov. 25, 1997

(86) PCT No.: PCT/FR97/02122

§ 371 Date: May 7, 1999

§ 102(e) Date: May 7, 1999

(87) PCT Pub. No.: WO98/23987

PCT Pub. Date: Jun. 4, 1998

(30) Foreign Application Priority Data

Nov. 25, 1996 (FR) .................................................. 96 14375

(51) Int. Cl.⁷ ....................................................... G02B 6/36
(52) U.S. Cl. .............................................. 385/53; 385/134
(58) Field of Search ............................. 385/53, 134, 135, 385/136, 137

(56) References Cited

U.S. PATENT DOCUMENTS

| 4,478,487 | 10/1984 | Obeissart . |
| 5,185,845 | * 2/1993 | Jones ..................................... 385/135 |
| 5,204,927 | 4/1993 | Chin et al. . |
| 5,515,472 | 5/1996 | Mullaney et al. . |
| 5,825,961 | * 10/1998 | Wilkins et al. ....................... 385/135 |

FOREIGN PATENT DOCUMENTS

| 30 06 131 A1 | 9/1981 | (DE) . |
| 213365 A1 | * 3/1987 | (EP) . |
| 0 490 644 A1 | 6/1992 | (EP) . |
| 0 575 258 A1 | 12/1993 | (EP) . |
| WO 94/00786 | 1/1994 | (WO) . |
| WO 97/01119 | 1/1997 | (WO) . |

\* cited by examiner

Primary Examiner—Frank G. Font
Assistant Examiner—Sang Hoang Nguyen
(74) Attorney, Agent, or Firm—Oliff & Berridge, PLC

(57) ABSTRACT

The invention relates to a connection device for optical fiber cables. It comprises: a longitudinal support having a substantially plane top face extending longitudinally and two convex side flanks extending longitudinally on either side of said top face and going towards the underside of said top face, the radius of curvature of the cross-section of each flank being not less than the minimum radius of curvature of the optical fibers of the cables to be connected; a plurality of individual connection elements for connecting optical fibers in pairs, each connection element extending transversely over the top face of the longitudinal support; and an empty space left beneath the longitudinal support and defined in part by the support, the optical fibers penetrating into the connection device via said empty space and coiling freely therein prior to going directly to an individual connection element fixed on the top face of the longitudinal support by being held against one of the flanks of said longitudinal support.

4 Claims, 5 Drawing Sheets

FIG_1

FIG._3

CONNECTING DEVICE FOR OPTICAL FIBER CABLES

The present invention relates to a connection device for optical fiber cables.

BACKGROUND OF THE INVENTION

Connection devices for optical fiber cables are used in particular for making up buried long distance lines where cable segments of determined length are united end-to-end.

Each connection device is housed in a sealed protective box which is generally filled with a gas under pressure to prevent dust penetrating into the box.

One of the difficulties encountered in designing such connection devices lies in organizing the various optical fibers of each cable, since each fiber needs to be connected individually to a fiber of another cable.

A connection device for optical fiber cables is already known in which the fibers are connected together in pairs by means of a splice and each pair of fibers made in this way is coiled and then housed in a cassette, thereby preventing the pairs of fibers from tangling with one another.

More precisely, in that known device, the optical fibers are connected together in pairs by means of individual splices which are grouped together side by side in one or more cassettes.

The reserve lengths of fiber which are necessary for making splices are then coiled and secured in the cassette(s) in the immediate vicinity of the splices, firstly to prevent them from tangling with one another, and secondly to keep control over their radius of curvature.

In that prior device, each fiber must be of determined length before the splicing operation so that in the final position of the splice in the cassette, the fiber loops can be positioned and secured in ordered manner. That constitutes a first difficulty in implementing the device.

In addition, in order to repair a splice or to interchange two splices, it is necessary to gain access to the inside of the or each cassette concerned, to release the fiber loops, and to change the lengths thereof as a function of the new organization for the splices after action has been taken. Those operations are thus particularly lengthy and difficult.

OBJECTS AND SUMMARY OF THE INVENTION

The present invention seeks to solve those drawbacks by proposing a novel connection device for optical fiber cables, which connection device comprises:

a longitudinal support having a substantially plane top face extending longitudinally and two convex side flanks extending longitudinally on either side of said top face and going towards the underside of said top face, the radius of curvature of the cross-section of each flank being not less than the minimum radius of curvature of the optical fibers of the cables to be connected;

a plurality of individual connection elements for connecting optical fibers in pairs, each connection element extending transversely over the top face of the longitudinal support; and an empty space left beneath the longitudinal support and defined in part by the support, the optical fibers penetrating into the connection device via said empty space and coiling freely therein prior to going directly to an individual connection element fixed on the top face of the longitudinal support by being held against one of the flanks of said longitudinal support.

In the connection device of the invention, the stripped optical fibers are subjected to a minimum amount of stress since they are held at their two ends only, i.e. on entry into the device where they penetrate into the empty space, and on the flanks of the longitudinal support immediately before reaching the individual connection elements.

Over the remainder of their length, the stripped optical fibers are left free to position themselves naturally in the empty space.

The connection device of the invention is preferably housed in a box having inlets for cables at both ends, said inlets opening out beneath the longitudinal support into the empty space.

Because of the empty space, all of the optical fibers coming from a single cable can have the same length whatever the particular individual connection element on which each fiber terminates.

In a preferred embodiment of the invention, the longitudinal support is mounted on a central leg about which the optical fibers can coil. This leg enables the longitudinal support to rotate relative to the box.

Thus, the connection device can be operated on by raising the longitudinal support slightly and causing it to turn through 90° relative to the box, the loops formed by the optical fibers in the space provided for this purpose constituting reserve lengths of fiber that make such rotation possible.

It will be understood that the connection device of the invention makes it easy to modify a connection by displacing the end of one optical fiber from one individual connection element to another, or to interchange the ends of two optical fibers, without any difficulty.

Similarly, if the end of an optical fiber has been damaged, the fiber can be shortened so as to prepare its end again merely by pulling lightly on the fiber, and the only consequence of so doing is to tighten the loop formed by the optical fiber beneath the longitudinal support.

In addition, because of the simple way in which optical fiber lengths are stored in the empty space, the device of the invention makes it possible to minimize the handling required for installing the fibers.

In this respect, the device of the invention is much more practical to implement than are conventional connection devices in which, as is generally recommended, the reserve lengths of optical fiber are coiled in cassettes and secured at a plurality of locations so that they follow an imposed path.

In a particular embodiment of the invention, the longitudinal support is of substantially oval cross-section.

In another embodiment, said longitudinal support is provided with guides on its flanks on either side of its top face carrying the connection elements, each guide leading a fiber radially from the bottom edge of the flank to the end of an individual connection element.

BRIEF DESCRIPTION OF THE DRAWINGS

In order to make the invention better understood, an embodiment given by way of non-limiting example is described below with reference to the accompanying drawings, in which.

MORE DETAILED DESCRIPTION

Figure 1:
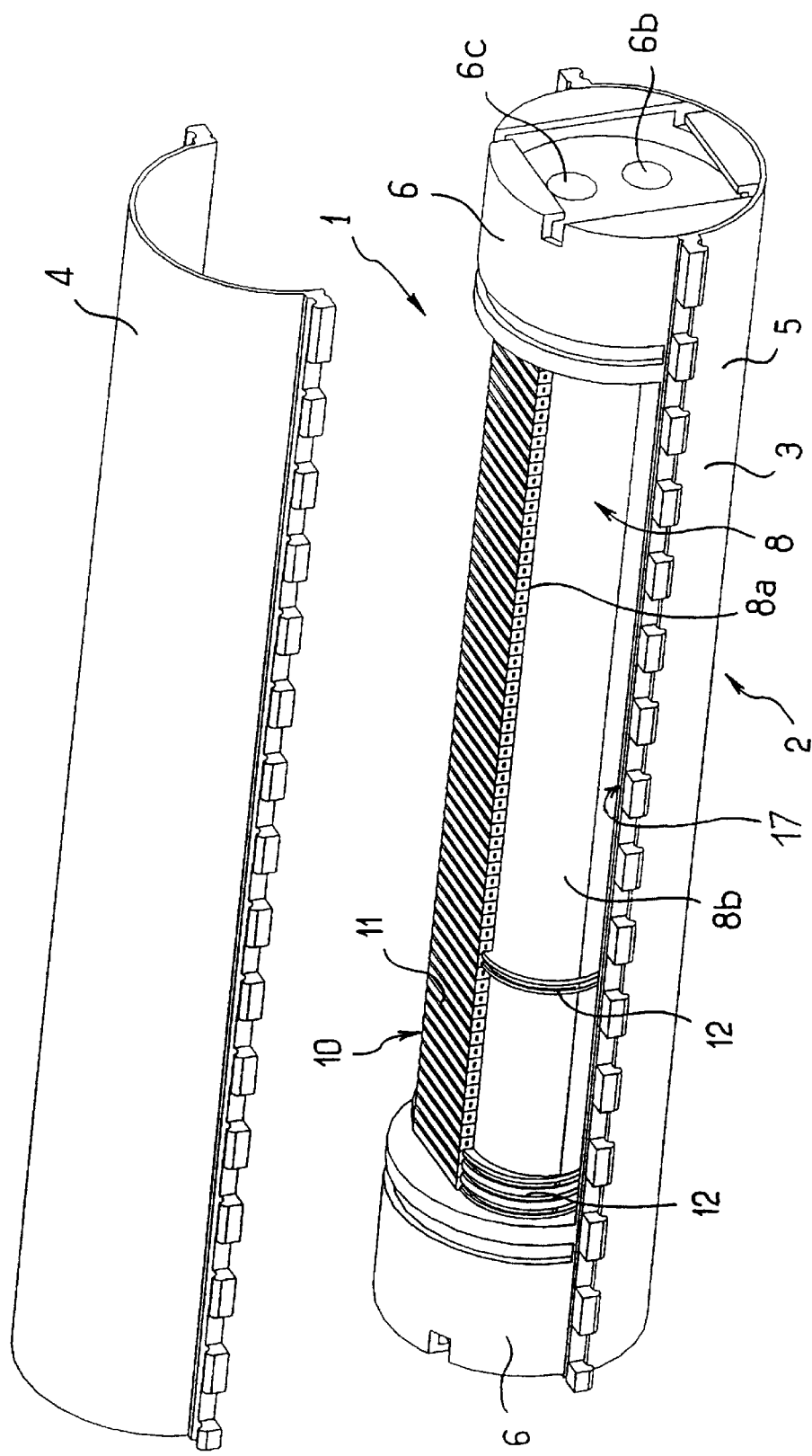
FIG. 1 is a perspective view of a box fitted with a connection device constituting an embodiment of the invention.

The device 1 shown in the drawing is housed in a cylindrical box 2 of longitudinal axis parallel to the longitudinal axis of the device, and provided with a base 3 and a cover 4 suitable for assembling together along two opposite generator lines of the box.

The base 3 of the box is itself constituted by a bottom shell 5 and two disk-shaped endpieces 6.

Each endpiece 6 has four holes 6a, 6b, 6c, and 6d to enable four cables to be inserted into the box.

Internally, the box defines a volume 7 in which the device 1 of the invention is housed.

The device 1 has a longitudinal support 8 of oval cross-section, having two flanks 8b and a top face 8a.

The top face 8a is substantially plane and in the form of a rectangular surface.

The side flanks 8b are convex, of circular section, and they extend from the top face 8a to which they are smoothly connected, to a point beneath said top face 8a. The radius of curvature of the side flanks is greater than or equal to the minimum radius of curvature of the cable fibers to be connected.

The support thus has an open bottom and defines an empty space 9 for the optical fibers, in particular between the top face 8a and the side flanks 8b.

The bottom of this empty space 9 is defined by the base of the box which is of a diameter that is large enough to receive the bottom edges of the side flanks 8b so that said empty space 9 is closed when the support 8 is in place in the base, with only two longitudinal slots 17 formed between the side flanks 8b and the side walls of the base leaving passages between said empty space 9 and the top of the support 8.

As explained below, these slots 17 allow the optical fibers to pass directly from the empty space 9 to the connection elements.

A strip 10 of parallel individual connection elements 11 is fixed to the top face 8a of the longitudinal support.

Each individual connection element 11 is presented transversely relative to the longitudinal support having its ends directed towards corresponding respective ones of the flanks 8b.

In register with the ends of the individual connection elements 11, the flanks 8b of the longitudinal support have guides 12 for the optical fibers, which guides are in the form of radially extending grooves, i.e. grooves lying in planes perpendicular to the longitudinal axis of the support.

These guides 12 serve to ensure that each fiber is conveyed radially from the bottom edge of a flank to the end of an individual connection element 11, thereby ensuring that the fibers are held against one of the flanks of the support.

Figure 2:
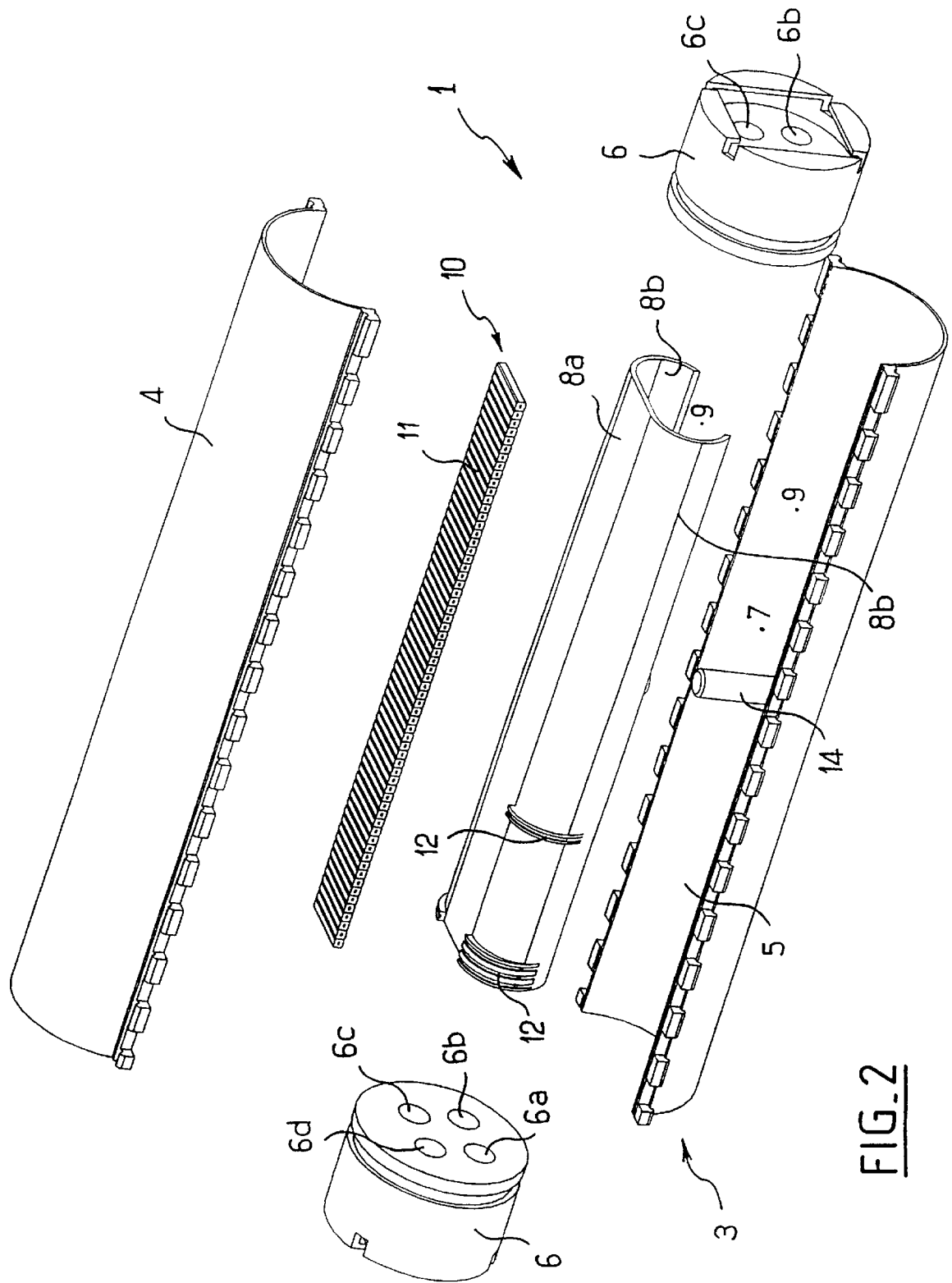
FIG. 2 is an exploded view of the FIG. 1 device.
Figure 3:
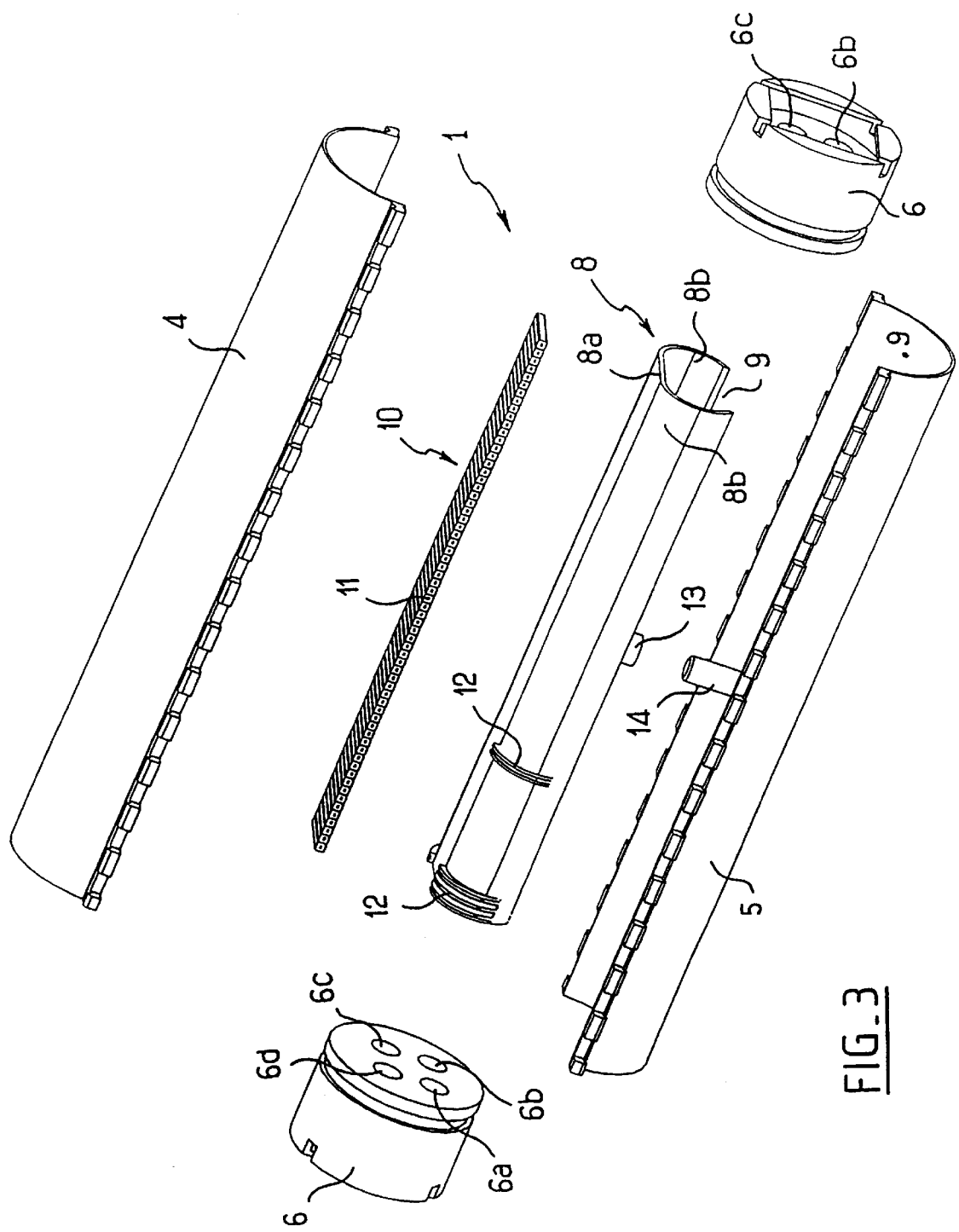
FIG. 3 is another exploded view of the same device.
Figure 4:
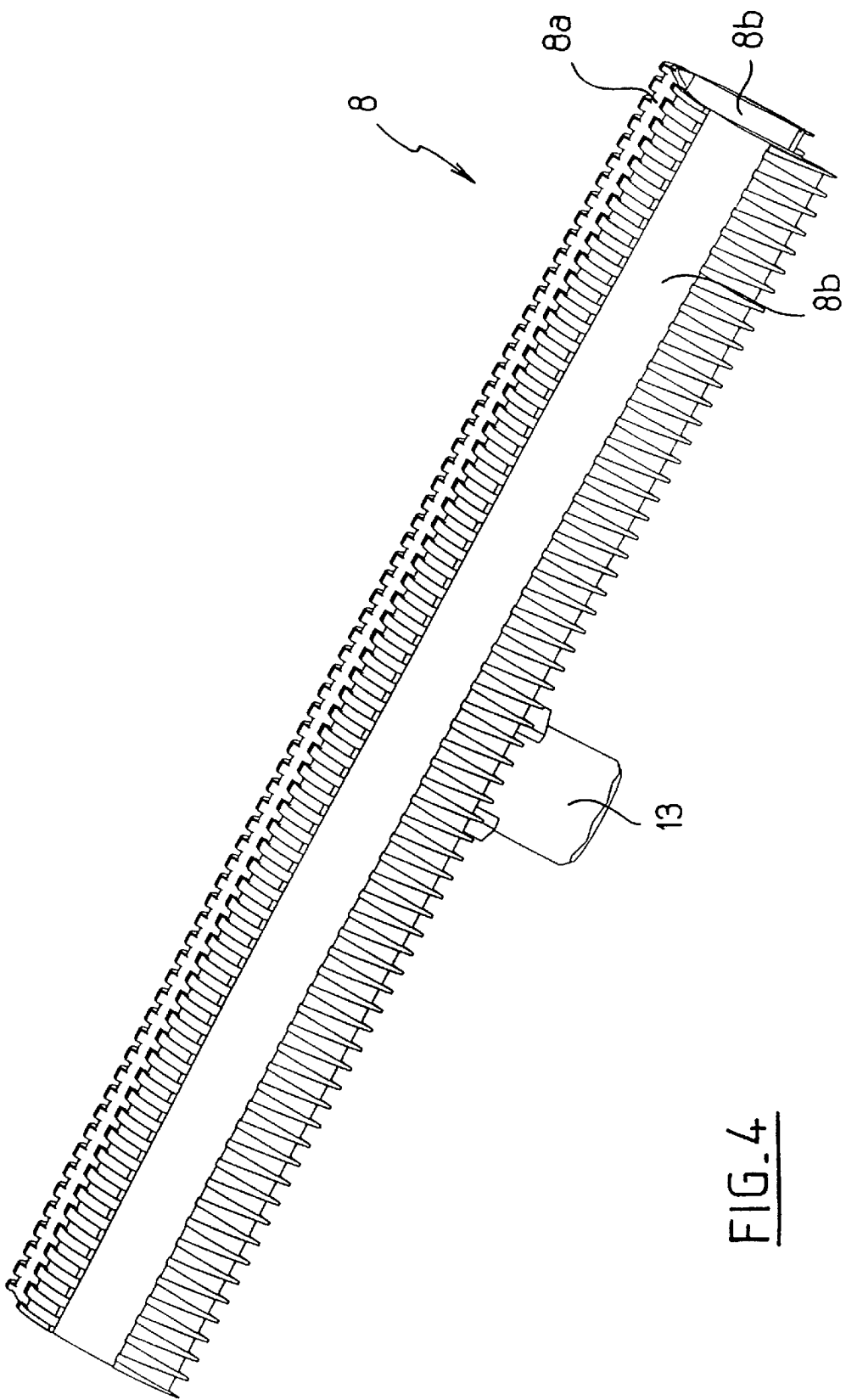
FIG. 4 shows the longitudinal support in perspective.

For reasons of clarity, not all of the grooves are shown in FIGS. 1, 2, and 3, but all of them appear in FIG. 4.

The support 8 has a central tube 13 under its top face and coinciding with a leg 14 provided on the shell 5 of the box.

Figure 6:
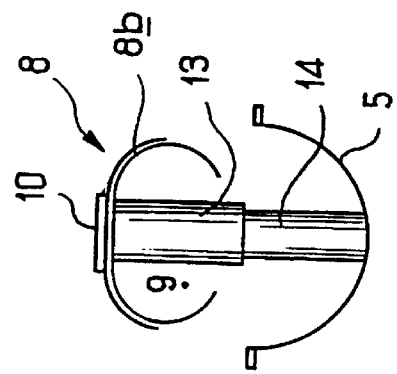
FIG. 6 is a section view on VI—VI of FIG. 7, the box being open and the longitudinal support raised.

The tube 13 and the leg 14 enable the longitudinal support 8 to be positioned in the box and they also enable said longitudinal support to rotate relative to the box when said support is slightly raised, as can be seen in the section of FIG. 6.

Figure 5:
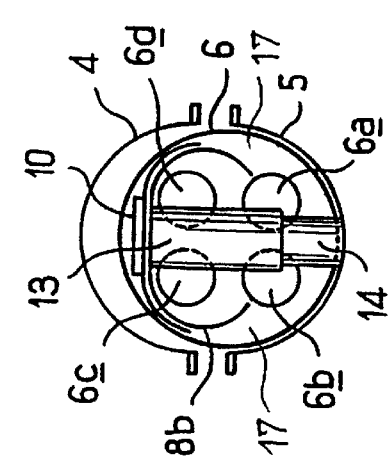
FIG. 5 is a section view on V—V of FIG. 7, the box being closed.

In the section view of FIG. 5, it can be seen that when the support 8 is housed in the box, the cable insertion orifices 6a, 6b, 6c, and 6d open out into the empty space 9 provided for the optical fibers beneath the longitudinal support.

Figure 7:
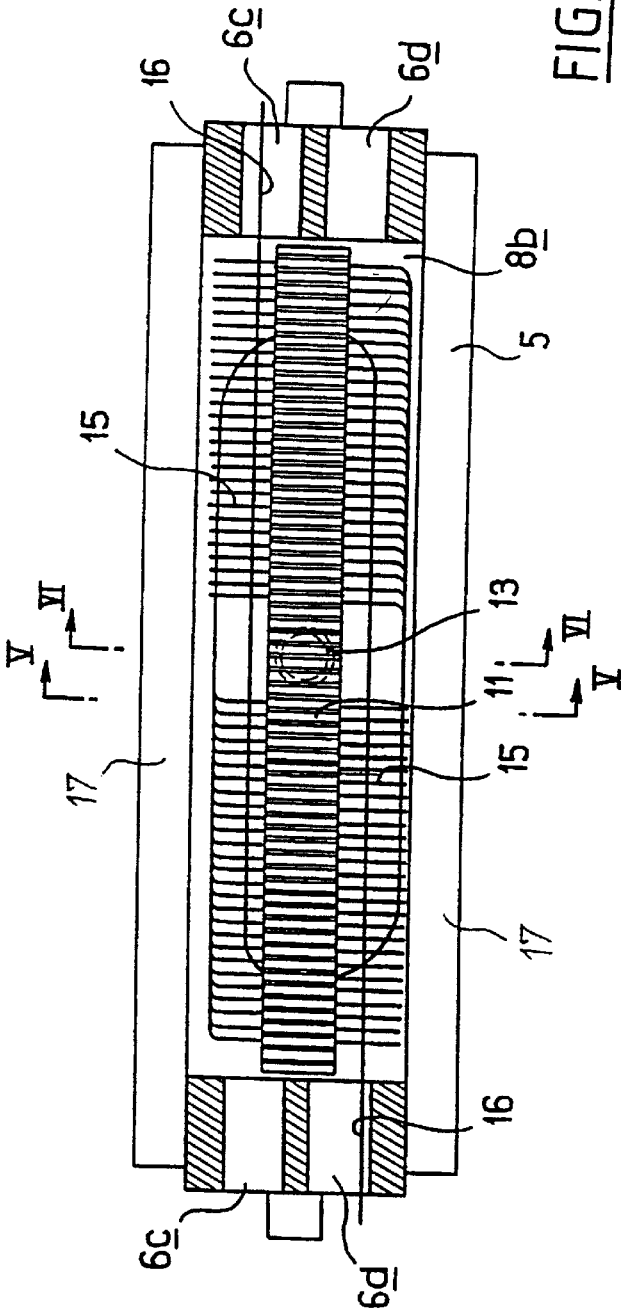
FIG. 7 is a diagrammatic plan view of the device after strands from two cables have been inserted and put into place.

In FIG. 7, the general arrangement of optical fibers 15 connected together in pairs via the individual connection elements 11 is shown in diagrammatic manner.

For reasons of clarity, only a single optical fiber 15 is shown as passing through insertion orifices 6c and 6d.

It can be seen that the optical fibers 15 terminate directly at the ends of respective individual connection elements 11 after coiling without stress in the empty space 9 provided for this purpose, and that they pass directly from the empty space to the connection elements via the side slots 17 where they are held by the grooves against the flanks which guarantee that they curve about a radius of curvature that is greater or equal to the minimum radius of curvature of the fibers.

It will be understood that arranging optical fibers in this way in the box makes it easier to maintain the connections.

The individual connection elements can be devices of the kind described in the Applicants' patent application Ser. No. 95 07987.

Naturally the embodiment described above is not limiting in any way and can receive any desirable modification without thereby going beyond the ambit of the invention.

What is claimed is:

1. A connection device for optical fiber cables, the device comprising:

a longitudinal support having a substantially plane top face extending longitudinally and two convex side flanks extending longitudinally on either side of said top face and going towards an underside of said top face, a radius of curvature of a cross-section of each flank being not less than a minimum radius of curvature of optical fibers of the optical fiber cables to be connected;

a plurality of individual connection elements for connecting optical fibers in pairs, each connection element extending transversely over the top face of the longitudinal support; and an empty space left beneath the longitudinal support and defined in part by the support, the optical fibers penetrating into the connection device via said empty space and coiling freely therein prior to going directly to an individual connection element fixed on the top face of the longitudinal support by being held against one of the side flanks of said longitudinal support;

said connection device being housed in a cylindrical box having inlets for cables at both ends, said inlets opening out beneath the longitudinal support into the empty space; and the box comprising a cover and a base, the base being of a diameter that is sufficient to receive bottom edges of the side flanks of the longitudinal support when the longitudinal support is put into place in the base with a longitudinal axis of the longitudinal support parallel to a longitudinal axis of the box, such that the empty space is closed when the longitudinal support is put into place in the base and only two longitudinal slots remain between the side flanks and side walls of the base to constitute passages between said empty space and the top face of the longitudinal support.

2. A device according to claim 1, wherein the longitudinal support is mounted on a central leg about which the optical fibers can coil and which enables the longitudinal support to rotate relative to the box.

3. A device according to claim 1, wherein the longitudinal support has a cross-section that is substantially oval, the top face being in the form of a rectangular surface and the side flanks being of circular section and extending smoothly from the top face to beneath said top face.

4. A device according to claim 1, wherein the longitudinal support is provided with guides on the side flanks, on either side of the top face carrying the connection elements, with each guide leading a respective fiber radially from the bottom edge of the flank to the end of an individual connection element.

* * * * *